United States Patent [19]

Lynch

[11] Patent Number: 5,759,609
[45] Date of Patent: Jun. 2, 1998

[54] LOW-FAT WHIPPED TOPPING

[75] Inventor: Robert J. Lynch, Buffalo, N.Y.

[73] Assignee: Rich Products Corporation, Buffalo, N.Y.

[21] Appl. No.: 537,336

[22] Filed: Oct. 2, 1995

[51] Int. Cl.$^6$ .................................................. A23G 9/00
[52] U.S. Cl. ........................ 426/570; 426/613; 426/804; 426/564
[58] Field of Search ........................ 426/570, 564, 426/613, 804, 571, 572, 573, 565, 566, 567

[56] References Cited

U.S. PATENT DOCUMENTS

| | | | |
|---|---|---|---|
| 3,199,988 | 8/1965 | Kozlik et al. | 426/570 |
| 3,597,233 | 8/1971 | Patterson | 426/564 |
| 3,806,605 | 4/1974 | Patterson | 426/570 |
| 3,928,649 | 12/1975 | Cobb | 426/565 |
| 4,012,533 | 3/1977 | Jonas | 426/565 |
| 4,034,122 | 7/1977 | Patterson | 426/564 |
| 4,088,792 | 5/1978 | Bracco | 426/570 |
| 4,143,170 | 3/1979 | Finucane et al. | 426/329 |
| 4,199,608 | 4/1980 | Gilmore et al. | 426/570 |
| 4,208,444 | 6/1980 | Gilmore et al. | 426/570 |
| 4,251,560 | 2/1981 | Dell et al. | 426/565 |
| 4,338,347 | 7/1982 | Trop et al. | 426/565 |
| 4,343,825 | 8/1982 | Takada | 426/570 |
| 4,370,353 | 1/1983 | Yagi et al. | 426/570 |
| 4,375,485 | 3/1983 | van Gennip | 426/570 |
| 4,388,337 | 6/1983 | Cawdron | 426/573 |
| 4,400,405 | 8/1983 | Morley et al. | 426/565 |
| 4,478,867 | 10/1984 | Zobel et al. | 426/570 |
| 4,547,385 | 10/1985 | Lindstam | 426/570 |
| 4,556,574 | 12/1985 | Andersson et al. | 426/570 |
| 4,564,529 | 1/1986 | Watson et al. | 426/570 |
| 4,578,276 | 3/1986 | Morley | 426/570 |
| 4,631,196 | 12/1986 | Zeller | 426/580 |
| 4,663,177 | 5/1987 | Weaver et al. | 426/579 |
| 4,668,520 | 5/1987 | Okonogi et al. | 426/564 |
| 4,770,892 | 9/1988 | Grealy et al. | 426/570 |
| 4,840,813 | 6/1989 | Greenberg et al. | 426/565 |
| 4,874,627 | 10/1989 | Greig et al. | 426/570 |
| 4,888,194 | 12/1989 | Andersen et al. | 426/570 |
| 4,985,270 | 1/1991 | Singer et al. | 426/515 |
| 5,077,076 | 12/1991 | Gonsalves et al. | 426/565 |
| 5,082,682 | 1/1992 | Peterson | 426/658 |
| 5,132,128 | 7/1992 | Rockland | 426/602 |
| 5,135,768 | 8/1992 | Campbell et al. | 426/602 |
| 5,143,741 | 9/1992 | Podolski et al. | 426/565 |
| 5,149,557 | 9/1992 | Morrison et al. | 426/570 |
| 5,154,942 | 10/1992 | Hirschey et al. | 426/72 |
| 5,171,602 | 12/1992 | Martin et al. | 426/567 |
| 5,190,776 | 3/1993 | Baumann | 426/94 |
| 5,215,776 | 6/1993 | Peterson | 426/564 |
| 5,221,549 | 6/1993 | Leshik | 426/579 |
| 5,232,731 | 8/1993 | Cain et al. | 426/580 |
| 5,238,699 | 8/1993 | King et al. | 426/573 |
| 5,242,695 | 9/1993 | Paradise | 426/93 |
| 5,264,226 | 11/1993 | Graille et al. | 426/34 |
| 5,290,581 | 3/1994 | Campbell et al. | 426/570 |
| 5,328,710 | 7/1994 | Malone et al. | 426/565 |
| 5,332,595 | 7/1994 | Gaonkar | 426/602 |
| 5,336,514 | 8/1994 | Jones et al. | 426/564 |
| 5,336,515 | 8/1994 | Murphy et al. | 426/573 |
| 5,352,474 | 10/1994 | Lammers et al. | 426/568 |
| 5,358,728 | 10/1994 | Martin et al. | 426/565 |
| 5,366,751 | 11/1994 | Pordy | 426/580 |
| 5,372,825 | 12/1994 | Campbell et al. | 426/42 |
| 5,384,145 | 1/1995 | Gonsalves et al. | 426/565 |
| 5,384,146 | 1/1995 | Gonsalves et al. | 426/565 |
| 5,389,393 | 2/1995 | Hembling et al. | 426/575 |
| 5,409,719 | 4/1995 | Cain et al. | 426/103 |
| 5,478,587 | 12/1995 | Mingione | 426/570 |

Primary Examiner—Cynthia L. Nessler
Attorney, Agent, or Firm—Kenyon & Kenyon

[57] ABSTRACT

A low-fat whipped topping having excellent performance and organoleptic properties comprising on a weight basis about 0.0% to 7.0% fat, about 0.20% to 0.8% emulsifiers, about 1.0% to 1.75% stabilizers and about 40% to 55% water soluble carbohydrates. The low-fat whipped topping has a caloric density of from 1.5 to 2.5 calories per gram and an overrun of at least 300%.

25 Claims, No Drawings

LOW-FAT WHIPPED TOPPING

BACKGROUND OF THE INVENTION

Health conscious consumers are becoming increasingly aware of the nutritional composition of the food products they purchase, and are seeking to reduce their fat and caloric intake. Accordingly, the demand for no fat, low fat and "light" fat food products has grown substantially in recent years. This trend has been particularly observed in the snack and dessert food areas.

In order to be economically successful, a reduced fat product must perform substantially as well as its full fat alternative as well as being organoleptically acceptable to the consumer. Reduced fat products must also meet the applicable regulatory definitions for reduced fat products. The Nutrition Labeling Education Act of 1993 legally defined categories pertaining to fat free, low fat and "light" foods as follows:

Fat Free

Less than 0.5 grams per reference amount.

Low Fat 3 grams or less per reference amount (and per 50 g if reference amount is small)

Light (Comparative Claim)

If a food derives 50 percent or more of its calories from fat, its fat content must be reduced by 50 percent or more per reference amount customarily consumed compared to an appropriate reference food.

or

If a food derives less than 50 percent of its calories from fat, a light claim can be made if the number of calories has been reduced by 33⅓ percent or the fat has be reduced by 50 percent.

Working with these guidelines, research toward developing a low/no fat, low caloric density dessert food product was initiated. A result of that research effort is the invention of the present application.

SUMMARY OF THE INVENTION

This invention is directed to dairy free no fat whipped topping foods which can be stored frozen in an unwhipped state for an indefinite period of time, thawed and whipped into a whipped dessert topping. It is expected that this product can be stored at freezer temperature for up to a year. Once whipped, the topping of the present invention may be stored at freezer temperature for extended period of time, or at refrigerated temperature for several days without spoilage, loss of consistency or degradation in its appearance.

The toppings of this invention are generally oil in water emulsions with water as the continuous phase. They typically comprise water from about 35% to about 60%, oils from about 3% to about 7%, sweeteners from about 30% to about 55% and small but effective quantities of additives such as protein, stabilizers, emulsifiers, flavorants, colorants and salts.

Throughout this application all percentages (except overruns) are by weight of the total composition unless stated otherwise. In the examples the amounts have been adjusted to a basis of 100 unless otherwise indicated. Percentages are based on total formulation weight unless a different basis is given.

DETAILED DESCRIPTION OF THE INVENTION

The dairy free whipped toppings of the invention are characterized by an oil in water emulsion with up to 7.0% fat on a weight basis, and whippable to an aeration level of at least a 350% overrun resulting in a caloric density of about 1.5 calories per gram to about 3 calories per gram. These toppings are also characterized by having approximately 40% to 60% total solids on a weight basis and preferably 40% to 50% total solids. The toppings prepared in accordance with this invention in examples A to H and J set forth hereinbelow have total solids on a weight basis of 50%±1%, example I set forth hereinbelow has total solids on a weight basis of 45%±1% and example K set forth hereinbelow has total solids on a weight basis of 42%±1%. The toppings of this invention are also characterized by improved performance and organoleptic properties. Performance characteristics of importance for whipped toppings include increased whipped stability over time and at refrigerated and elevated temperatures. Improved resistance to cracking, flowing, bulging and weeping of the whipped toppings of the present invention are all beneficial performance characteristics associated with the novel composition of these whipped toppings. Of equal importance is the organoleptic acceptability of the whipped toppings of the present invention. The toppings of the present invention provide the consumer public with low fat and low caloric density whipped toppings which are organoleptically acceptable that have the following beneficial characteristics:

(A) unwhipped liquid product that has improved stability (as measured by the length of a period of maintenance at refrigerated temperature, or a temperature up to about 60° F.) following which the product can be whipped;

(B) whipped topping that has high whipping overrun, such as between 300 and 500 percent, and preferably between 350 and 500 percent;

(C) whipped topping that has a shelf life, prior to whipping, of about 1 year or longer when maintained at or about 0° F.;

(D) whipped topping having consumer-acceptable organoleptic characteristics which is stable to cracking, bulging, flowing, visual coarseness and air cell coalescence at room temperature for at least about one hour and remains extendable and spreadable, and capable of being made into rosettes of acceptable quality;

(E) whipped topping having consumer-acceptable organoleptic characteristics which is stable to cracking, bulging, flowing, visual coarseness and air cell coalescence when maintained at about 40° F. for at least about two to six days.

The toppings of this invention are generally characterized by a water activity from about 0.90 to about 0.98 and preferably from 0.93 to 0.95. Several mathematical methods are available for calculating water activity, even of formulations containing different solutes and with non-solutes. Rough calculations based on the additive effect of the number of moles of each component multiplied by the activity of the component are useful for estimating water activity. Such calculations reduce the number of experimental measurements that might otherwise be needed and thus assist in reaching a suitable formulation more quickly. A combination of mathematical techniques with trial and error experiments followed by analytical measurements for determining water activity will lead to acceptable results.

The toppings of this invention are also characterized by a specific gravity in liquid form of from about 1.25 to about 1.15 and preferably from about 1.20 to about 1.17. In whipped form, the toppings of the present invention have a specific gravity of from about 0.36 to about 0.27 and preferably from about 0.34 to about 0.28 with aeration overruns of about 350% to about 420%.

A preferred method for preparing an emulsion product of this invention comprises blending all of the ingredients in the desired ratios. Usually most of the dry ingredients (gums, proteins, emulsifiers and salts) are first dispersed in hot (160° F.–190° F.) water. The sweeteners are typically then added to the mix. The fat portion plus lecithin may also be preheated and then mixed in. The ingredients are pasteurized by holding the mix at an elevated temperature for several minutes, i.e., at 165° F. for five minutes.

The blended ingredients are then passed through a homogenizer of the typical dairy type. Although homogenization may be accomplished in one stage, it is carried out in two stages for best results. Preferably, the pressure during the first stage is maintained at a minimum of about 500 psi and a maximum of about 1,000 psi, most preferably about 500 psi, and the pressure during the second stage is maintained at about 2000 psi to 10,000 psi, preferably about 7000 psi. The mix is usually maintained at a temperature of from about 140° F. to 190° F. during homogenization.

The emulsion is initially cooled to a temperature of from about 40° F. to about 55° F. Whipping consists of passing the liquid product through a conventional whipper for the incorporation of air. It is envisioned that an inert gas such as nitrogen, carbon dioxide, nitrous oxide or the like may be used in place of air. The whipper may be of conventional construction that permits cooling during whipping. Successful use of HOBART® type mixers has been made during the preparation of the toppings of this invention and it is anticipated that an OAKS® type continuous mixer may also be successfully used. The emulsion can be whipped to an overrun of from about 300% to 500%.

The liquid emulsions of this invention were examined by dipping a spatula in the emulsion; letting it drain and noting whether the residual film was smooth and uniform or whether particles were present—denoting complete dispersion of the ingredients and lack of destabilization or fat coalescence in the emulsion. These emulsions were also evaluated for their intended functional application. The product formulations were whipped or aerated and tested for volume (density) and the ability of the foam to remain stable—loss of volume due to air loss and/or syneresis (separation of the water phase). Cakes were topped with the whipped product and stored at refrigerator temperature, approximately 40° F., for several days. Their appearance was noted as was the constitution of whipped topping left in the mixing bowl at the time of application.

Sweeteners comprise from about 30% to about 55% of the toppings of the present invention and are the principle source of solids in the composition. The particular ratios of the sweeteners used in the preparation of the toppings of this invention may be varied to obtain preferred levels of sweetness in accordance with the intended final use of the product. Generally, the sweeteners used in this invention are high fructose corn syrup, corn syrup with a dextrose equivalent of about 15 to about 65, preferably from about 34 to about 38, sugar and dextrose. In addition to varying the ratios of the various sweeteners, the dextrose equivalency of the corn syrup may also be varied to provide varying levels of sweetness to meet the requirements of the end use of the product. The amount of high fructose corn syrup is from about 20% to about 30% and is preferably about 20% to 25% of the total composition. A preferred high fructose corn syrup is ISOCLEAR® high fructose corn syrup manufactured by Cargill, Cedar Rapids, Iowa The amount of corn syrup is from about 15% to about 20% of the total composition. The amount of corn syrup will vary depending on the dextrose equivalent used. The calculations for these variations are well known to those skilled in the art. A preferred corn syrup, used in this invention, has a dextrose equivalent 36 (CLEARDEX® 36/43 corn syrup, Cargill, Cedar Rapids, Iowa). It is well known in the art that there are several DE corn syrups available in the industry that may be used in the preparation of the toppings of the invention. Sugar accounts for about 7% to 10% of the total composition and more preferably from about 8% to about 9%. The sugar used in the toppings of the present invention was purchased from Monitor Sugar Company, 2600 Euclid Ave., Bay City, Mich., and was analyzed to be 99.9% sucrose The amount of dextrose is preferably from about 2% to about 3%. A preferred dextrose used in this invention is CERELOSE® Dextrose 2001 manufactured by Corn Products, Englewood Cliffs, N.J.

The fats used in the compositions of this invention are preferably the vegetable fats or oils commonly employed in whipped toppings. Such fats or oils may be fully or partially hydrogenated. Hydrogenated oils such as coconut and palm kernel oil have typically been used in the production of whipped toppings. A wide variety of fats may be used in the present invention and include soybean oil, cottonseed oil and palm oil among others. Substitutions for the fats set forth hereinbelow can be accomplished by one skilled in the art and appropriate fats for substitutions are well known in the art, as described in co-pending Patent Application Ser. No. 08/196,334 which is expressly incorporated herein by reference.

The present invention provides for the use of blended combinations of particular triglyceride fats (a first fraction and at least a second fraction) wherein the small amount of triglyceride fat of said second fraction (a hardening fat) contributes to the whipped stability at elevated temperatures of said product and confection respectively without detracting substantially from the organoleptic properties contributed by said first fraction.

In the present invention palm kernel oil is a more preferred oil and a modified palm kernel oil is most preferred. The palm kernel oil used is a palm kernel oil hydrogenated to an iodine value of about 1. The modified palm kernel oil component (NEUTRESCA™ 75-46, Aarhus, Inc., Port Newark, N.J.) which contributes approximately 4.00% of the total weight of the product was a blend of 98% (w/w) palm kernel oil hydrogenated to an iodine value of about 1, and 2% (w/w) of the (fully) hydrogenated form of the stearin fraction of palm oil. It has also been observed that the stearin fraction of palm kernel oil, a harder fraction, is an acceptable substitute for the modified palm kernel oil.

It will be appreciated that the triglyceride fat component of the whipped toppings of the present invention can be provided through the blending of various other different fats and fractions thereof.

Emulsifiers are necessary ingredients of those compositions of the present invention which contain fats and are oil-in-water emulsions. A wide variety of emulsifiers may be employed in amounts from about 0.05% to about 5%, preferably about from 0.2% to 1.5%. The emulsifiers induce the formation of a stable emulsion and improve the rate and total aeration obtained. Among the more suitable emulsifiers are: lecithin, hydroxylated lecithin; mono, di, or polyglycerides of fatty acids, such as stearin and palmitin mono and diglycerides; polyoxyethylene ethers of fatty esters of polyhydric alcohols, such as the polyoxyethylene ethers of sorbitan monostearate (polysorbate 60) or the polyoxyethylene ethers of sorbitan distearate; fatty esters of polyhydric alcohols such as sorbitan monostearate; polyglycerol esters of mono and di glycerides such as hexaglyceryl distearate; mono- and diesters of glycols such as propylene glycol monostearate, and propylene glycol monopalmitate, succinoylated monoglycerides; sucrose esters and the esters of carboxylic acids such as lactic, citric, and tartaric acids with the mono- and diglycerides of fatty acids such as glycerol lacto palmitate and glycerol lacto stearate. The fatty acids employed in the preparation of the emulsifiers include those derived from beef, tallow, and coconut, cotton seed, palm, peanut, soybean and marine oils. Many blends of emulsifiers are commercially used and readily available in accordance with known techniques. It has been found to be desirable to provide a controlled hydrophilic-lipophilic balance (HLB) as with a lipophilic emulsifier such as glyceryl monostearte, sorbitan monostearte or lecithin with a hydrophilic material such as polysorbate 60. The HLB ratio is determined by summing the product of each emulsifier hydrophobicity contribution which is determined as follows:

((emul. wgt %)/(tot. emul. wgt %))(hydrophobicity of emul.)

It has been found to be beneficial in the preparation of the toppings of the present invention to maintain the HLB ratio of the emulsifiers between 7.0 and 8.5.

Preferred emulsifiers used in this invention include polyglycerol esters of mono and di glycerides such as hexaglyceryl disterate. A preferred hexaglyceryl disterate is POLY-ALDO® HGDS sold by Lonza Specialty Chemicals, Fair Lawn, N.J. used in the present invention in an amount from 0.10% to 0.50%. Another preferred emulsifier is the polyoxyethylene ether of sorbitan monostearate, polysorbate 60, available as GLYCOSPERSE® S-20 from Lonza Specialty Chemicals, Fair Lawn, N.J. used in an amount from 0.05% to 0.25%. Lecithin is also a preferred emulsifier and a preferred lecithin is available from Central Soya, Fort Wayne, Ind. under the trademark CENTROL® 3F UB and is used in the compositions of the present invention in an amount from 0.01% to 0.25%.

The emulsion compositions of the present invention also include one or more stabilizers of hydrophilic colloids to improve the body and texture of toppings, and as an aid in providing freeze-thaw stability. These stabilizers are natural, i.e. vegetable, or synthetic gums and may be, for example, carrageenin, guar gum, alginate, xanthan gum and the like or methylcellulose, carboxy methylcellulose, ethylcellulose, hydroxypropyl methylcellulose, micro-crystalline cellulose and the like, and mixtures thereof. Typically, a gum or combination of gums is employed with a sugar, e.g. dextrose, carrier. The amount of these stabilizers can be varied widely, generally about from 0.0% to 2.0%, preferably about from 0.1 to 0.5%.

Preferred stabilizers used in this invention include hydroxypropyl methylcellulose METHOCEL® E5 or E15, Dow Chemical Co. with E15 being more preferred in an amount from 0.10% to 1.0%. It is recognized that a wide range of hydroxypropyl methylcellulose formulations are acceptable including E50 and E5. Similarly, it is recognized that a wide range of methylcellulose formulations may be used successfully in this invention. A preferred methylcellulose is METHOCEL® A15 or A400, Dow Chemical Company. The most preferred A chemistry METHOCEL® utilized in this invention is a 1:1 blend of A15 and A400 in an amount from 0.10% to 1.0%. Ingredient number 6 in table 1 set forth hereinbelow refers to the most preferred 1:1 blend of A15 and A400. It has been observed that the preferred hydroxypropyl methylcellulose and methylcellulose formulations utilized in the toppings of this invention are generally of lower viscosity. However it is recognized that higher viscosity formulations may be used with the appropriate modifications to the composition of the topping to compensate for the increased viscosity.

Additional stabilizers that are utilized in the whipped toppings of the present invention include alginate and xanthan gum. A variety of alginate sources may be used in this invention and a preferred source is propylene glycol alginate (KELCOLOID™ HVF, Kelco, San Diego, Calif.) in an amount from 0.05% to 0.50%. Xanthan gum, available as KELTROL™ from Kelco, San Diego, Calif., is also preferably used in an amount from 0.05% to 0.50%.

Protein concentrates and isolates are useful to improve the nutritional qualities of whipped toppings and to facilitate and maintain a whipped structure. Protein also aids in emulsification and contributes to flavor. Bland protein concentrates with a wide range of fiber content, bland soy flour, milk powder and food proteins are all useful, generally in concentrations about from 0.0% to 10%, preferably about from 0.3 to 3.0%. Alternatively a protein such as sodium or calcium caseinate which is conventional in whipped toppings, or as its substitute a protein hydrolysate in a minor amount is useful in the present invention. The most preferred caseinate for use in this invention is sodium caseinate (ALANATE 110™ New Zealand Milk Products Inc., Santa Rosa, Calif.) and preferred range is 0.25%–3.00% and a most preferred range is 0.5%–1.00%.

Many soy protein preparations are known to the art and may be used in this invention. An important characteristic of any soy protein used in this invention is its solubility. For purposes of this invention a preferred soy protein concentrate is PROCON® 2000 from Central Soya, Fort Wayne, Id., It is recognized that soy protein concentrates and isolates with solubility similar to the preferred soy protein are suitable for use in this invention.

Many types of salts are used in the compositions of this invention for buffering and flavoring, including common salt (sodium chloride), sodium or potassium phosphates, citrates, chlorides, and the like, in amounts about from 0% to 5.0%, but preferably about from 0.1% to 1.0%. Salts used in this invention include sodium acid pyrophosphate, sodium chloride sodium citrate dihydrate and disodium phosphate anhydrous.

Other ingredients known to those skilled in the art may also be employed to impart their characteristic effects to the compositions of the present invention. Typical of such ingredients are flavoring agents, colorants, vitamins; minerals, and the like. Suitable flavoring agents can be employed to impart vanilla, cream, chocolate, coffee, maple, spice mint, butter, caramel, fruit and other flavors. Additionally, the use of certain polyols such as sorbitol and mannitol can be employed to modify mouth-feel. Furthermore, other additives such as phosphates and the like may be employed for their known functions. Preferred additional ingredients used in this invention include flavorants such as Nata cream (Natural cream flavor, WONF #47.10492) and vanilla flavor 1313 (#143.13259) both from Bell Flavors and Fragrances, Northbrook, Ill. maltol F.C.C. (VELTOL®, Pfizer Inc., Groton, Conn.) and colorants including extracts of annatto seeds and rhizomes of turmeric (VEGETONE®, Kalsec, 3713 W. Main St., Kalamazoo, Mich.).

The foregoing ingredients may be used in their normal amounts and may vary from the representative amounts and ranges given herein. Food formulations and ranges of ingredients do not readily permit of fixed parameters because of variations in customer preferences which may vary with cultural preferences.

An additional advantage of the whipped toppings of the invention is that the liquid product can be subjected to ultra high temperature treatments and aseptic processing with advantageous results. There are many UHT processing methods known in the art that are suitable for use in this invention including direct steam infusion and plate heat exchanger systems.

In a representative embodiment, the liquid form of the product of the present invention is processed in a plate heat exchanger or in a narrow tubular system using bundles of tubes. The product flow is surrounded by high pressure steam or hot water in a closed system. Processing of product is typically accomplished at about 280° F. for about 2 seconds with subsequent cooling to about 160° F., homogenized and further cooled to about 40° F.

Burrell) and include the capacity to incorporate vaporized hydrogen peroxide treatment for sterilization of the packaging. Accordingly, packages are typically received as preformed blanks which are erected and treated in the packaging equipment. More effective stabilization of the packages (including bathing in hydrogen peroxide, followed by flashing thereof) contributes substantially to storage of aseptic product that can be held for at least one year at about 50° to 60° F. An aseptic system useful in the practice of this invention is TETRAPAK®.

EXAMPLES

The following examples are not intended to be limiting, but rather illustrative of some approaches taken and of course which may be varied in accordance with the spirit and scope of this description. Table 1 presents the formula, on a weight percentage basis, of the compositions prepared in accordance with this invention as set forth in examples A through K.

TABLE 1

| Ingredient/Example | A | B | C | D | E | F | G | H | I | J | K |
|---|---|---|---|---|---|---|---|---|---|---|---|
| 1. ISOCLEAR ® HFCS | 23.0 | 23.0 | 23.0 | 23.0 | 23.0 | 23.0 | 23.0 | 23.0 | 21.5 | 23.0 | 20.105 |
| 2. Sugar | 0.5206 | 0.5246 | 0.5646 | 0.5646 | 0.5646 | 0.5646 | 0.5646 | 0.5646 | 0.5646 | 0.5646 | 0.5646 |
| 3. Soy Protein (PRO CON 2000 ®) | 0.80 | 0.80 | 0.80 | 0.80 | 0.80 | 0.80 | 0.80 | 0.80 | 0.80 | 0.80 | 0.80 |
| 4. Hydroxypropyl methyl cellulose (E15) | — | 0.50 | 0.50 | 0.50 | 0.50 | 0.30 | 0.50 | 0.30 | 0.50 | 0.20 | 0.50 |
| 5. Hydroxypropyl methyl cellulose (E5) | 0.50 | — | — | — | — | — | — | — | — | — | — |
| 6. Methyl Cellulose (A chemistry METHOCEL) | 0.70 | 0.70 | 0.70 | 0.70 | 0.70 | 0.50 | 0.70 | 0.50 | 0.70 | 0.40 | 0.50 |
| 7. Xanthan Gum (KELTROL ™) | 0.12 | 0.12 | 0.12 | 0.12 | 0.12 | 0.12 | 0.12 | 0.12 | 0.12 | 0.12 | 0.12 |
| 8. Propylene glycol alginate (KELCOLOID ™ HVF) | 0.12 | 0.20 | 0.16 | 0.16 | 0.16 | 0.16 | 0.16 | 0.16 | 0.16 | 0.16 | 0.16 |
| 9. Sodium Citrate | 0.049 | 0.049 | 0.049 | 0.049 | 0.049 | 0.049 | 0.049 | 0.049 | 0.049 | 0.049 | 0.049 |
| 10. Sodium acid pyrophosphate | 0.049 | 0.049 | 0.049 | 0.049 | 0.049 | 0.049 | 0.049 | 0.049 | 0.049 | 0.049 | 0.049 |
| 11. Sodium Chloride | 0.058 | 0.058 | 0.058 | 0.058 | 0.058 | 0.058 | 0.058 | 0.058 | 0.058 | 0.058 | 0.058 |
| 12. Lecithin | 0.0875 | 0.0875 | 0.0875 | 0.0875 | 0.0875 | 0.0875 | 0.0875 | 0.0875 | 0.0875 | 0.0875 | 0.0875 |
| 13. Polysorbate 60 | 0.1125 | 0.1125 | 0.1125 | 0.1125 | 0.1125 | 0.1125 | 0.1125 | 0.1125 | 0.1125 | 0.1125 | 0.1125 |
| 14. POLYALDO ® HGDS 6-2-S | 0.20 | 0.20 | 0.20 | 0.20 | 0.20 | 0.20 | 0.20 | 0.20 | 0.20 | 0.20 | 0.20 |
| 16. H$_2$O | 39.4314 | 39.4314 | 39.4314 | 39.4314 | 39.4314 | 39.4314 | 39.4314 | 39.4314 | 44.4314 | 39.4314 | 48.4314 |
| 17. 36 DE Corn Syrup (CLEARDEX ®) | 18.2664 | 18.2664 | 18.2664 | 18.2664 | 18.2664 | 18.2664 | 18.2664 | 18.2664 | 16.7664 | 18.2664 | 15.4664 |
| 18. Sugar | 8.385 | 8.305 | 8.305 | 8.305 | 8.305 | 8.705 | 9.305 | 9.705 | 6.305 | 8.905 | 5.0 |
| 19. Dextrose | 2.5 | 2.5 | 2.5 | 2.5 | 2.5 | 2.5 | 2.5 | 2.5 | 2.5 | 2.5 | 2.5 |
| 20. Modified palm kernel oil | 4.0 | 4.0 | 4.0 | 4.0 | — | 4.0 | 3.0 | 3.0 | 4.0 | 4.0 | 4.0 |
| 21. Palm Kern Oil | — | — | — | — | 4.0 | — | — | — | — | — | — |
| 22. Sodium Caseinate | 0.75 | 0.75 | 0.75 | 0.75 | 0.75 | 0.75 | 0.75 | 0.75 | 0.75 | 0.75 | 0.75 |
| 23. DiSodium Phosphate | 0.10 | 0.10 | 0.10 | 0.10 | 0.10 | 0.10 | 0.10 | 0.10 | 0.10 | 0.10 | 0.10 |
| 24. VEGETONE ® | 0.0013 | 0.0013 | 0.0013 | 0.0013 | 0.0013 | 0.0013 | 0.0013 | 0.0013 | 0.0013 | 0.0013 | 0.0013 |
| 26. Van. Flavor 1313 | 0.1850 | 0.1850 | 0.1850 | 0.1850 | 0.1850 | 0.1850 | 0.1850 | 0.1850 | 0.1850 | 0.1850 | 0.1850 |
| 27. Veltol | 0.00037 | 0.00037 | 0.00037 | 0.00037 | 0.00037 | 0.00037 | 0.00037 | 0.00037 | 0.00037 | 0.00037 | 0.00037 |
| 28. Nata-Cream | 0.06 | 0.06 | 0.06 | 0.06 | 0.06 | 0.06 | 0.06 | 0.06 | 0.06 | 0.06 | 0.06 |
| 29. HERBALOX ® | 0.0040 | — | — | — | — | — | — | — | — | — | — |

Typically, unwhipped liquid product of the invention processed by ultra high temperature processing and packaged in a clean packaging system, such as PURPAK®, ensures at least about 60 to 70 days of shelf life when stored at 40° F.

Such packaging systems are known in the art, for example, using model equipment (EQ3 and EQ4 of Cherry

Example A

A 30,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. Ingredient 29, (HERBALOX®) was added to the HFCS and agitation started. Premixed ingredients 2 to 11 and 22 were added and mixed until they dissolved. The following ingredients were added sequentially: ingredient 14 (POLYALDO® 6-2-S), ingredient 23 (Disodium phosphate), and ingredient 13 (Polysorbate 60). Ingredient 1 (HFCS) was added dropping the temperature to 146° F. and the mixture was heated to 155° F. Ingredients, 17 (corn syrup), 18 (sugar) and 19 (dextrose) were then added sequentially to the heated agitating mixture dropping the temperature to 142° F. The agitation was stopped and ingredients 20 (modified palm kernel oil), at 130° when added to the batch, 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Three samples were assessed as follows:

i. A sample of the mixture was refrigerated for two and a half hours. The emulsion showed no separation or noticeable particles present.

The sample of the mixture was aerated by placing 650 grams of the cooled mixture (47° F.) in an N50 Hobart type whipping device and whipping at medium speed (130 rpm) for 14 minutes. Prior to whipping the liquid mixture weighed 244.41 grams/206 ml and after whipping the topping weighed 63.4 grams/206 ml resulting in an overrun of 385%.

ii. A second sample of the mixture was refrigerated overnight. It showed no separation or noticeable particles. The sample was aerated by placing 650 grams of the cooled mixture (47° F.) was whipped at medium speed (130 rpm) in an N50 Hobart type whipping device for 14 minutes. Prior to whipping the liquid mixture weighed 245.83 grams/206 ml and after whipping the topping weighed 58.89 grams/206 ml resulting in an overrun of 417%.

A cake was decorated with the whipped topping and some was left in the bowl and the results over five days storage at refrigerator temperatures were recorded as follows:

At twenty-four hours the cake topping showed no cracking, bulging or flowing. The rosettes were still sharp however there was a slight gloss. The topping in the bowl was firm, smooth and showed no syneresis.

At forty-eight hours the cake topping showed no flowing or bulging and the rosettes were still sharp however there was slight cracking. The topping in the bowl showed no syneresis and was soft.

At one hundred and twenty hours the cake topping showed substantial cracking and there were bubbles forming. The topping in the bowl showed syneresis and was very soft and runny.

iii. A sample of the liquid product was frozen after preparation and thawed at room temperature. 650 grams of the thawed, cooled mixture (47° F.) was whipped at medium speed (130 rpm) in an N50 Hobart type whipping device for 13 minutes. Prior to whipping the liquid mixture weighed 244.4 grams/206 ml and after whipping the topping weighed 55.93 grams/206 ml resulting in an overrun of 437%. A cake was decorated with the whipped topping and some was left in the bowl and the results over four days were recorded as follows:

At twenty-four hours the cake topping was good and showed no sagging. The topping in the bowl was very good and showed no change.

At seventy-two the cake topping showed no flowing or bulging and the rosettes were still sharp however cracking was significant. The topping in the bowl was smooth and showed no syneresis.

At ninety-six hours the cake topping showed no flowing and the rosettes are very sharp however there was significant cracking. The topping in the bowl was firm and showed no syneresis but was coarse.

Example B

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), at 30° when added to batch, 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Two samples were assessed as follows:

i. A sample of the mixture was refrigerated overnight. The emulsion showed no separation or noticeable particles present.

The sample was aerated by placing 650 grams of the cooled mixture (47° F.) in an N50 Hobart type whipping device and whipping at medium speed (130 rpm) for 13 minutes. Prior to whipping the liquid mixture weighed 242.39 grams/206 ml and after whipping the topping weighed 64.01 grams/206 ml resulting in an overrun of 378%.

A cake was decorated with the whipped topping and some was left in the bowl and the results over four days storage at refrigerator temperatures were recorded as follows:

At twenty-four hours the cake topping showed no cracking, bulging or flowing. The rosettes were still sharp. The topping in the bowl was smooth and showed no syneresis.

At ninety-six hours the cake topping showed no cracking, flowing or bulging and the rosettes were still sharp and were not glossy. The topping in the bowl showed no syneresis and was soft and smooth.

ii. A second sample of the liquid product was frozen after preparation, stored and thawed at room temperature. 650 grams of the thawed, cooled mixture (47° F.) was whipped at medium speed (130 rpm) in an N50 Hobart type whipping device for 11.3 minutes. Prior to whipping the liquid mixture weighed 246.04 grams/206 ml and after whipping the topping weighed 64.8 grams/206 ml resulting in an overrun of 379%. A cake was decorated with the whipped topping and some was left in the bowl and the results over four days were recorded as follows:

The topping applied easily and did not soften.

At twenty-four hours the cake topping was good and showed no sagging. The topping in the bowl was very good and showed no change.

At seventy-two hours the cake topping showed no flowing however bulging is noticeable and cracking was significant. The topping in the bowl was smooth and showed no syneresis.

Example C

A 20,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Four samples were assessed as follows:

i. A sample of the mixture was refrigerated overnight. The emulsion showed no separation or noticeable particles present.

A sample of the mixture was aerated by placing 650 grams of the cooled mixture (47° F.) in an N50 Hobart type whipping device and whipping at medium speed (130 rpm) for 12.6 minutes. Prior to whipping the liquid mixture weighed 247.3 grams/206 ml and after whipping the topping weighed 66.53 grams/206 ml resulting in an overrun of 371%.

A cake was decorated with the whipped topping and some was left in the bowl and the results over six days storage at refrigerator temperatures were recorded as follows:

At twenty-four hours the cake topping showed no cracking, bulging or flowing. The rosettes were still sharp. The topping in the-bowl was firm and not glossy and showed no syneresis.

At forty-eight hours the cake topping showed no cracking, bulging or flowing. The rosettes were still sharp. The topping in the bowl was firm and showed no syneresis.

At seventy-two hours the cake topping was smooth and showed no cracking, bulging or flowing. The rosettes were still sharp. The topping in the bowl was smooth and thick and showed no syneresis.

At ninety-six hours the cake topping showed no flowing, cracking or bulging and the rosettes were still sharp and but were a little glossy. The topping in the bowl showed no syneresis and was smooth and still usable.

At one hundred and forty four hours the cake topping showed no flowing, cracking or bulging and the rosettes were still sharp however water collected by the rosettes at the bottom of the cake. The topping in the bowl showed no syneresis and was smooth.

ii. Refrigerated liquid topping was added to previously whipped product which had been held at 40° F. for twenty-four hours. The cooled mixture (47° F.) was whipped at medium speed (130 rpm) in an N50 Hobart type whipping device for 5 minutes. Prior to whipping the liquid mixture weighed 247.19 grams/206 ml and after whipping the topping weighed 71.85 grams/206 ml resulting in an overrun of 344%. The whipped product resulted in an overrun which was too low to meet the NLEA standards to claim non fat status. A cake was decorated with the whipped topping and some was left in the bowl and the results over twenty four hours were recorded as follows:

The cake topping showed no flowing, cracking or bulging however there was slight air cell coalescence. The topping in the bowl was thick and glossy and showed no syneresis. However the density was too high to meet the fat free claim per serving.

iii. Another sample of the liquid product was frozen after preparation and thawed at refrigerator temperature. The thawed product sample was stable showing no separation or particle formation. 650 grams of the thawed, cooled mixture (47° F.) was whipped at medium speed (130 rpm) in an N50 Hobart type whipping device for 15.5 minutes. Prior to whipping the liquid mixture weighed 247.49 grams/206 ml and after whipping the topping weighed 62.9 grams/206 ml resulting in an overrun of 393%. A cake was decorated with the whipped topping and some was left in the bowl and the results over five days were recorded as follows:

The topping whipped to a nice heavy thick product. The cake decorated easily and the topping did not become soft while decorating.

At twenty-four hours the cake topping looked extremely good and showed no cracking, flowing or bulging and the rosettes were sharp. The topping in the bowl was thick and smooth and showed no syneresis.

At forty-eight hours the cake topping showed no flowing, cracking or bulging and the rosettes were still sharp. The topping in the bowl was thick and smooth and showed no syneresis.

At seventy-two hours the cake topping showed no flowing, cracking or bulging however there was slight cracking but was overall very good. The topping in the bowl was slightly coarse but it could still be used to decorate and it showed no syneresis.

At one hundred and twenty hours the cake topping showed no flowing or bulging and the rosettes were still sharp however there was significant cracking. The topping in the bowl was smooth and showed no syneresis but was glossy.

iv. A sample of the liquid product was frozen after preparation, stored and thawed at refrigerator temperature. After thawing the liquid product was stored for one week prior to whipping. The emulsion was still stable with no separation or particles observable. 650 grams of the thawed, cooled mixture (47° F.) was whipped at medium speed (130 rpm) in an N50 Hobart type whipping device for 13.3 minutes. Prior to whipping the liquid mixture weighed 247.19 grams/206 ml and after whipping the topping weighed 60.5 grams/206 ml resulting in an overrun of 408%. A cake was decorated with the whipped topping and some was left in the bowl and the results over two days were recorded as follows:

The topping whipped up to a thick and full bodied topping.

At twenty-four hours the cake topping showed no cracking bulging or flowing and the rosettes were sharp. The topping in the bowl was smooth, very thick, had good body and showed no syneresis.

At forty-eight two hours the cake topping looked good however there was some slight cracking. The topping in the bowl was smooth, thick and showed no syneresis.

Example D

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Two samples were assessed as follows:

i. A sample of the mixture was refrigerated six and a half hours. The emulsion showed no separation or noticeable particles present.

A sample of the mixture was aerated by placing 650 grams of the cooled mixture (47° F.) in an N50 Hobart type whipping device and whipping it at medium speed (130 rpm) for 15.83 minutes. Prior to whipping the liquid mixture weighed 245.5 grams/206 ml and after whipping the topping weighed 61.5 grams/206 ml resulting in an overrun of 399%.

A cake was decorated with the whipped topping and some was left in the bowl and the results over three days storage at refrigerator temperatures were recorded as follows:

The topping was soft and not easy to work with.

At twenty-four hours the cake topping looked good and showed no cracking, bulging or flowing. The topping in the bowl was soft, had a very foamy mouthfeel and showed no syneresis.

At seventy-two hours the cake topping showed no flowing or bulging however the rosettes were not sharp and there was cracking on the top of the cake. The topping in the bowl showed slight syneresis and was glossy and runny.

ii. A second sample of the liquid product was frozen after preparation, stored and thawed at refrigerator temperatures. After thawing the emulsion showed no separation or particle formation. 650 grams of the thawed, cooled mixture (47° F.) was whipped at medium speed (130 rpm) in an N50 Hobart type whipping device for 14.5 minutes. Prior to whipping the liquid mixture weighed 247.07 grams/206 ml and after whipping the topping weighed 60.6 grams/206 ml resulting in an overrun of 407%. A cake was decorated with the whipped topping and some was left in the bowl and the results over three days were recorded as follows:

The topping whipped up thick and applied easily.

At twenty-four hours the cake topping looked good and showed no cracking, flowing or bulging and the rosettes were very sharp. The topping in the bowl was thick, smooth and showed no syneresis.

At forty-eight hours the cake topping showed no flowing or bulging however there was slight cracking at the top of the cake. The topping in the bowl was glossy and showed no syneresis.

At seventy-two hours the cake topping showed no flowing or bulging and the rosettes were still sharp however cracking was significant. The topping in the bowl was soft and showed no syneresis.

Example E

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 21 (palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Two samples were assessed as follows:

i. A sample of the mixture was refrigerated for three days. The emulsion showed no separation or noticeable particles present.

A sample of the mixture was aerated by placing 650 grams of the cooled mixture (47° F.) in an N50 Hobart type whipping device and whipping it at medium speed (130 rpm) for 16 minutes. Prior to whipping the liquid mixture weighed 247.07 grams/206 ml and after whipping the topping weighed 64.86 grams/206 ml resulting in an overrun of 380%.

A cake was decorated with the whipped topping and some was left in the bowl and the results over three days storage at refrigerator temperatures were recorded as follows:

The topping was soft, looked a little foamy but was easy to work with.

At twenty-four hours the cake topping looked good and showed no cracking, bulging or flowing. The rosettes were smooth. The topping in the bowl looked good and was thick and showed no syneresis.

At forty-eight hours the cake topping showed some slight cracking but there was no flowing or bulging. The topping in the bowl was smooth still held its peaks, had good body and showed no syneresis.

At seventy-two hours the cake topping was similar to the forty eight hour results. The rosettes were still sharp and the cake looked good. The topping in the bowl showed no syneresis and was smooth.

ii. A second sample of the liquid product was frozen after preparation and thawed at refrigerator temperatures. After thawing the emulsion showed no separation or particle formation. 650 grams of the thawed, cooled mixture (47° F.) was whipped at medium speed (130 rpm) in an N50 Hobart type whipping device for 14.75 minutes. Prior to whipping the liquid mixture weighed 247.80 grams/206 ml and after whipping the topping weighed 56.58 grams/206 ml resulting in an overrun of 438%. A cake was decorated with the whipped topping and some was left in the bowl and the results over three days were recorded as follows:

The topping whipped up thick and applied easily and did not soften.

At twenty-four hours the cake topping looked excellent and showed no problems and the rosettes were very sharp. The topping in the bowl was thick and showed no syneresis.

At forty-eight hours the cake topping showed no flowing or bulging however there was slight cracking over the entire cake. The topping in the bowl was very glossy and showed no syneresis.

At seventy-two hours the cake topping was cracking severely. The topping in the bowl was very glossy and showed no syneresis.

Example F

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Three samples were assessed as follows:

i. A sample of the mixture was refrigerated for six days. The emulsion showed no separation or noticeable particles present The sample was aerated by placing 650 grams of the cooled mixture (47° F.) in an N50 Hobart type whipping device and whipping at medium speed (130 rpm) for 14.75 minutes. Prior to whipping the liquid mixture weighed 248.84 grams/206 ml and after whipping the topping weighed 63.6 grams/206 ml resulting in an overrun of 391%.

A cake was decorated with the whipped topping and some was left in the bowl and the results over three days storage at refrigerator temperatures were recorded as follows:

At twenty-four hours the cake topping showed no cracking or flowing and only slight bulging. The rosettes were still sharp. The topping in the bowl was smooth, thick and showed no syneresis.

At forty-eight hours the cake topping showed no cracking and only slight bulging. The rosettes were still extremely sharp and were not glossy. The topping in the bowl showed no syneresis and was soft and smooth.

At seventy-two hours the cake topping looked extremely good and showed no cracking, flowing or bulging. The rosettes were still very sharp. The topping in the bowl looked very good, showed no syneresis and was soft and smooth.

ii. A second sample of the liquid product was frozen after preparation, stored and thawed at refrigerator temperatures. 650 grams of the thawed, cooled mixture (47° F.) was whipped at medium speed (130 rpm) in an N50 Hobart type whipping device for 11.9 minutes. Prior to whipping the liquid mixture weighed 247.43 grams/206 ml and after whipping the topping weighed 57.7 grams/ 206 ml resulting in an overrun of 428%. A cake was decorated with the whipped topping and some was left in the bowl and the results over three days were recorded as follows:

The topping applied easily and provided very sharp rosettes.

At twenty-four hours the cake topping was good and showed no cracking, flowing or bulging and the rosettes were very sharp. The topping in the bowl was thick, smooth and showed no syneresis.

At forty-eight hours the cake was accidentally ruined and no observations were recorded. The topping in the bowl was smooth, showed no syneresis and was not too coarse.

iii. A third sample of the liquid product was frozen after preparation, stored and thawed at refrigerator temperature. The emulsion showed no separation or noticeable particles present. 650 grams of the thawed, cooled mixture (47° F.) was whipped at medium speed (130 rpm) in an N50 Hobart type whipping device for 12.8 minutes. Prior to whipping the liquid mixture weighed 249.2 grams/206 ml and after whipping the topping weighed 63.4 grams/206 ml resulting in an overrun of 393%. A cake was decorated with the whipped topping and some was left in the bowl and the results over three days were recorded as follows:

At twenty-four hours the cake topping showed no flowing or syneresis however there was very slight cracking. The topping in the bowl was firm, smooth and showed no syneresis.

At forty-eight hours the cake topping showed no flowing or bulging however cracking was significant. The rosettes were still very sharp. The topping in the bowl was firm, showed no syneresis and was slightly coarse.

At seventy-two hours the cake topping was very bad with significant flowing and the rosettes losing shape. The topping in the bowl showed no syneresis but was coarse, soft and flowing in the bowl.

Example G

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation begun. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Four samples were assessed as follows:

i. A sample of the mixture was refrigerated overnight. The emulsion showed no separation or noticeable particles present.

The sample was aerated by placing 650 grams of the cooled mixture (47° F.) in an N50 Hobart type whipping device and whipping at medium speed (130 rpm) for 11.7 minutes. Prior to whipping the liquid mixture weighed 251.74 grams/206 ml and after whipping the topping weighed 58.7 grams/206 ml resulting in an overrun of 429%.

A cake was decorated with the whipped topping and some was left in the bowl and the results over two days storage at refrigerator temperatures were recorded as follows:

At twenty-four hours the cake topping showed no cracking, flowing or slight bulging. The rosettes were still sharp. The topping in the bowl was smooth and showed no syneresis.

At forty-eight hours the cake topping showed no cracking and slight flowing. The rosettes were still extremely sharp and were glossy. The topping in the bowl showed no syneresis but was soft, foamy and very glossy.

ii. A second sample of the liquid product was frozen after preparation, stored and thawed at refrigerator temperature. The thawed liquid product showed no particle formation or separation. 650 grams of the thawed, cooled mixture (47° F.) was whipped at medium speed (130 rpm) in an N50 Hobart type whipping device for 13.33 minutes. Prior to whipping the liquid mixture weighed 250.74 grams/206 ml and after whipping the topping weighed 56.5 grams/206 ml resulting in an overrun of 444%. A cake was decorated with the whipped topping and some was left in the bowl and the results over two days were recorded as follows:

The topping applied easily.

At twenty-four hours the cake topping showed no cracking, flowing or bulging. The topping in the bowl was good and showed no syneresis.

At forty-eight hours the cake topping showed significant cracking, slight flowing however the rosettes were still sharp and there was no significant bulging. The topping in the bowl was very soft, foamy and coarse but showed no syneresis.

iii. A third sample of the liquid product was frozen after preparation, stored five days and thawed at refrigerator temperature. The emulsion showed no separation or noticeable particles present. 650 grams of the thawed, cooled mixture (47° F.) was whipped at medium speed (130 rpm) in an N50 Hobart type whipping device for 14.2 minutes. Prior to whipping the liquid mixture weighed 248.8 grams/206 ml and after whipping the topping weighed 65.3 grams/206 ml resulting in an overrun of 381%. A cake was decorated with the whipped topping and some was left in the bowl and the results over two days were recorded as follows:

At twenty-four hours the cake topping showed no cracking or syneresis however there was very slight flowing. The topping in the bowl was firm, smooth and showed no syneresis.

At forty-eight hours the cake topping showed slight flowing, slight cracking and the rosettes were starting to lose their shape. The topping in the bowl was very soft, showed slight syneresis and was very coarse.

iv. A fourth sample of the liquid product was frozen after preparation, stored five days and thawed at refrigerator temperature. The emulsion showed no separation or noticeable particles present. 650 grams of the thawed, cooled mixture (47° F.) was whipped at medium speed (130 rpm) in an N50 Hobart type whipping device for 13 minutes. Prior to whipping the liquid mixture weighed 247.6 grams/206 ml and after whipping the topping weighed 60 grams/206 ml resulting in an overrun of 413%. A cake was decorated with the whipped topping and some was left in the bowl and the results over two days were recorded as follows:

At twenty-four hours the cake topping showed no cracking, flowing or syneresis. The topping in the bowl was firm, smooth and showed no syneresis.

At forty-eight hours the cake topping showed slight flowing, slight cracking and had a glossy appearance. The topping in the bowl was flowing in the bowl, showed no syneresis and was coarse.

Example H

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation begun. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 49° F. Three samples were assessed as follows:

i. A sample of the mixture was refrigerated for 3.5 hours. The emulsion showed no separation or noticeable particles present.

The sample was aerated by placing 650 grams of the cooled mixture (47° F.) in an N50 Hobart type whipping device and whipping at medium speed (130 rpm) for 15.9 minutes. Prior to whipping the liquid mixture weighed 247.94 grams/206 ml and after whipping the topping weighed 64.74 grams/206 ml resulting in an overrun of 383%.

A cake was decorated with the whipped topping and some was left in the bowl and the results over two days storage at refrigerator temperatures were recorded as follows:

At twenty-four hours the cake topping looked excellent, showing no cracking, flowing or bulging. The rosettes were still sharp The topping in the bowl was smooth, firm and showed no syneresis.

At forty-eight hours the cake topping showed slight cracking but no flowing or bulging. The rosettes were still extremely sharp. The topping in the bowl showed no syneresis and was firm, smooth and glossy.

ii. A second sample of the liquid product was frozen after preparation, stored and thawed at refrigerator temperature. The thawed liquid product showed no particle formation or separation. 650 grams of the thawed, cooled mixture (47° F.) was whipped at medium speed (130 rpm) in an N50 Hobart type whipping device for 13 minutes. Prior to whipping the liquid mixture weighed 246.84 grams/206 ml and after whipping the topping weighed 62.86 grams/206 ml resulting in an overrun of 393%. A cake was decorated with the whipped topping and some was left in the bowl and the results over four days were recorded as follows:

The topping was soft but applied easily.

At twenty-four hours the cake topping showed no cracking or bulging however there was slight flowing. The rosettes were still sharp. The topping in the bowl was smooth, firm and showed no syneresis.

At ninety-six hours the cake topping showed was completely deteriorated. The topping in the bowl was smooth, slightly coarse and flowed in the bowl.

iii. A third sample of the liquid product was frozen after preparation, stored and thawed at refrigerator temperature. The emulsion showed no separation or noticeable particles present. 650 grams of the thawed, cooled mixture (47° F.) was whipped at medium speed (130 rpm) in an N50 Hobart type whipping device for 12.25 minutes. Prior to whipping the liquid mixture weighed 246.84 grams/206 ml and after whipping the topping weighed 662.25 grams/206 ml resulting in an overrun of 396.5%. A cake was decorated with the whipped topping and some was left in the bowl and the results over four days were recorded as follows:

At twenty-four hours the cake topping showed slight cracking at thin areas of topping however there was no flowing, bulging or syneresis. The topping in the bowl was glossy and soft but it was smooth and showed no syneresis.

At ninety-six hours the cake topping was completely deteriorated. The topping in the bowl was coarse, glossy and flowed in the bowl.

Example I

A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. Two samples were assessed as follows:

i. A sample of the mixture was refrigerated overnight.

The sample was aerated by placing 650 grams of the cooled mixture (47° F.) in an N50 Hobart type whipping device and whipping at medium speed (130 rpm) for 12.9 minutes. Prior to whipping the liquid mixture weighed 243.16 grams/206 ml and after whipping the topping weighed 59.7 grams/206 ml resulting in an overrun of 407%.

A cake was decorated with the whipped topping and some was left in the bowl and the results over four days storage at refrigerator temperatures were recorded as follows:

At twenty-four hours the cake topping showed no cracking, flowing or bulging. The rosettes were very sharp. The topping in the bowl was soft and foamy and showed no syneresis.

At forty-eight hours the cake topping showed no cracking, flowing or bulging. The rosettes were still sharp. The topping in the bowl showed no syneresis and was firm and smooth.

At seventy-two hours the cake topping looked good and showed no flowing or bulging and only slight cracking. The rosettes were glossy but still sharp. The topping in the bowl looked very good, showed no syneresis and was firm and glossy.

At ninety-six hours the cake topping showed very slight cracking but no flow or bulging. The topping in the bowl was firm and slightly wet looking.

ii. A second sample of the liquid product was frozen after preparation, stored and thawed at refrigerator temperature. 650 grams of the thawed, cooled mixture (47° F.) was whipped at medium speed (130 rpm) in an N50 Hobart type whipping device for 14 minutes. Prior to whipping the liquid mixture weighed 243.64 grams/206 ml and after whipping the topping weighed 58.1 grams/206 ml resulting in an overrun of 419%. A cake was decorated with the whipped topping and some was left in the bowl and the results over two days were recorded as follows:

The topping applied easily and was easy to work with.

At twenty-four hours the cake topping looked excellent and showed slight cracking and flowing. The topping in the bowl was smooth and very firm.

At forty-eight hours the cake topping showed cracking all over the cake however there was no flowing or bulging. The rosettes were still very sharp. The topping in the bowl was soft, showed no syneresis and was capable of forming peaks Example J A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation started. Premixed ingredients 2 to 11 and 22 were added. The following ingredients were added sequentially: ingredient 14 (POLYALDO® 6-2-S), ingredient 23 (Disodium phosphate), and ingredient 13 (Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. One sample was assessed as follows:

i. A sample of the mixture was frozen after preparation, stored and thawed at refrigerator temperature.

The sample was aerated by placing 650 grams of the cooled mixture (47° F.) in an N50 Hobart type whipping device and whipping at medium speed (130 rpm) for 12.5 minutes. Prior to whipping the liquid mixture weighed 244.16 grams/206 ml and after whipping the topping weighed 62.1 grams/206 ml resulting in an overrun of 394%.

A cake was decorated with the whipped topping and some was left in the bowl and the results over three days storage at refrigerator temperatures were recorded as follows:

At twenty-four hours the cake topping showed no flowing or bulging and only slight cracking. The rosettes were extremely sharp. The topping in the bowl was firm, capable of holding peaks, showed no syneresis and was glossy.

At forty-eight hours the cake topping showed very slight cracking and flowing. The topping in the bowl showed no syneresis but was foamy, very wet looking and flowed in the bowl Example K A 10,000 gram batch of whipped topping of the present invention was prepared in accordance with the following procedure. Ingredients 2 to 11 and 22 were premixed. The water was added to a pasteurizer, (GROEN® kettle with air actuator, Arrow Engineering, Hillside, N.J.) and heated to 175° F. and agitation begun. Premixed ingredients 2 to 11 and 22 were added. The following ingredients were added sequentially: ingredient 14 (POLYALDO® 6-2-S), ingredient 23 (Disodium phosphate), and ingredient 13

(Polysorbate 60). Ingredients 1 (HFCS), 17 (corn syrup), 18 (sugar) and 19 (dextrose) were then added sequentially to the heated agitating mixture. The agitation was stopped and ingredients 20 (modified palm kernel oil), 12 (lecithin), and 24 (VEGETONE®) were mixed together and added to the batch. Agitation was restarted and the mixture was heated to 165° F. Ingredients 26 (Vanilla Flavor 1313), 27 (VELTOL®) and 28 (Nata cream) were added and the mixture was two step homogenized at 500 psi and 7000 psi reducing the oil particulate size to about 0.5 to 1.5 microns. The homogenized mixture was then cooled down to 47° F. to 51° F. One sample was assessed as follows:

i. A sample of the mixture was frozen after preparation, stored and thawed at refrigerator temperature. The mixture showed no particle formation or separation.

The sample was aerated by placing 650 grams of the cooled mixture (47° F.) in an N50 Hobart type whipping device and whipping at medium speed (130 rpm) for 15.37 minutes. Prior to whipping the liquid mixture weighed 239.67 grams/206 ml and after whipping the topping weighed 53.23 grams/206 ml resulting in an overrun of 450%.

A cake was decorated with the whipped topping and some was left in the bowl and the results over one day storage at refrigerator temperatures was recorded as follows:

At twenty-four hours the cake topping was starting to flow and there was very slight cracking. The rosettes were starting to crack. The topping in the bowl was very smooth and firm.

The physical characteristics of each of the toppings of the examples are set forth in table 2. The performance characteristics of each of the toppings of the example are set forth in table 3.

TABLE 2

| Example | S.G. Liquid/Whipped | Caseinate/Fat Ratio | Caloric Density Calories/Gram | O/R | HLB | Emul/Fat Ratio | Stab/Fat Ratio | Fat % |
|---|---|---|---|---|---|---|---|---|
| A i | 1.19/0.31 | 0.1875 | 2.2 | 385% | 8.2 | 0.10 | 0.36 | 4.0 |
| ii | 1.19/0.29 | 0.1875 | 2.2 | 417% | 8.2 | 0.10 | 0.36 | 4.0 |
| iii | 1.19/0.27 | 0.1875 | 2.2 | 437% | 8.2 | 0.181 | 0.36 | 4.0 |
| B i | 1.18/0.31 | 0.1875 | 2.2 | 378% | 8.2 | 0.10 | 0.38 | 4.0 |
| ii | 1.19/0.31 | 0.1875 | 2.2 | 379% | 8.2 | 0.10 | 0.38 | 4.0 |
| C i | 1.20/0.32 | 0.1875 | 2.2 | 371% | 8.2 | 0.10 | 0.37 | 4.0 |
| ii | 1.20/0.35 | 0.1875 | 2.2 | 344% | 8.2 | 0.10 | 0.37 | 4.0 |
| iii | 1.20/0.31 | 0.1875 | 2.2 | 393% | 8.2 | 0.10 | 0.37 | 4.0 |
| iv | 1.20/0.29 | 0.1875 | 2.2 | 408% | 8.2 | 0.10 | 0.37 | 4.0 |
| D i | 1.19/0.30 | 0.1875 | 2.2 | 399% | 8.2 | 0.10 | 0.37 | 4.0 |
| ii | 1.20/0.29 | 0.1875 | 2.2 | 407% | 8.2 | 0.10 | 0.37 | 4.0 |
| E i | 1.20/0.31 | 0.1875 | 2.2 | 380% | 8.2 | 0.10 | 0.37 | 4.0 |
| ii | 1.20/0.27 | 0.1875 | 2.2 | 438% | 8.2 | 0.10 | 0.37 | 4.0 |
| F i | 1.21/0.31 | 0.1875 | 2.2 | 391% | 8.2 | 0.10 | 0.27 | 4.0 |
| ii | 1.20/0.28 | 0.1875 | 2.2 | 428% | 8.2 | 0.10 | 0.27 | 4.0 |
| iii | 1.21/0.31 | 0.1875 | 2.2 | 393% | 8.2 | 0.10 | 0.27 | 4.0 |
| G i | 1.22/0.28 | 0.25 | 2.2 | 429% | 8.2 | 0.13 | 0.49 | 3.0 |
| ii | 1.22/0.27 | 0.25 | 2.2 | 444% | 8.2 | 0.13 | 0.49 | 3.0 |
| iii | 1.21/0.32 | 0.25 | 2.2 | 381% | 8.2 | 0.13 | 0.49 | 3.0 |
| iv | 1.20/0.29 | 0.25 | 2.2 | 413% | 8.2 | 0.13 | 0.49 | 3.0 |
| H i | 1.20/0.31 | 0.25 | 2.2 | 383% | 8.2 | 0.13 | 0.36 | 3.0 |
| ii | 1.20/0.31 | 0.25 | 2.2 | 393% | 8.2 | 0.13 | 0.36 | 3.0 |
| iii | 1.20/0.30 | 0.25 | 2.2 | 397% | 8.2 | 0.13 | 0.36 | 3.0 |
| I i | 1.18/0.29 | 0.1875 | 2.0 | 407% | 8.2 | 0.1 | 0.37 | 4.0 |
| ii | 1.18/0.28 | 0.1875 | 2.0 | 419% | 8.2 | 0.1 | 0.37 | 4.0 |
| J i | 1.18/0.30 | 0.1875 | 2.2 | 394% | 8.2 | 0.1 | 0.22 | 4.0 |
| K i | 1.16/0.26 | 0.1875 | 1.9 | 450% | 8.2 | 0.1 | 0.32 | 4.0 |

TABLE 3

PERFORMANCE CHARACTERISTICS OF TOPPINGS

| FORMULA | OVERRUN % | ON CAKE 24 HRS. | IN BOWL 24 HRS. | ON CAKE 48 HRS. | IN BOWL 48 HRS. | ON CAKE 72 HRS. | IN BOWL 72 HRS. | ON CAKE 96 HRS. | IN BOWL 96 HRS. |
|---|---|---|---|---|---|---|---|---|---|
| A i | 385 | NT | NT | NT | NT | NT | NT | NT | |
| ii | 417 | +++ | +++ | +++ | +++ | ++ | ++ | — | |
| iii | 437 | +++ | +++ | ++ | ++ | + | + | — | |
| B i | 378 | +++ | +++ | NT | NT | NT | NT | ++ | ++ |
| ii | 379 | +++ | +++ | NT | NT | + | + | NT | NT |
| C i | 371 | +++ | +++ | +++ | +++ | +++ | +++ | +++ | +++ |
| ii | 344 | + | ++ | NT | NT | NT | NT | NT | NT |
| iii | 393 | +++ | +++ | +++ | +++ | ++ | +++ | + | +++ |
| iv | 408 | +++ | +++ | ++ | +++ | NT | NT | NT | NT |
| D i | 399 | +++ | +++ | NT | NT | + | + | NT | NT |
| ii | 407 | +++ | +++ | ++ | +++ | + | +++ | NT | NT |
| E i | 380 | +++ | +++ | ++ | +++ | + | +++ | NT | NT |
| ii | 438 | +++ | +++ | ++ | +++ | + | +++ | NT | NT |
| F i | 391 | +++ | +++ | +++ | +++ | +++ | +++ | NT | NT |

TABLE 3-continued

PERFORMANCE CHARACTERISTICS OF TOPPINGS

| FORMULA | | OVERRUN % | ON CAKE 24 HRS. | IN BOWL 24 HRS. | ON CAKE 48 HRS. | IN BOWL 48 HRS. | ON CAKE 72 HRS. | IN BOWL 72 HRS. | ON CAKE 96 HRS. | IN BOWL 96 HRS. |
|---|---|---|---|---|---|---|---|---|---|---|
| | ii | 393 | ++ | ++ | + | + | — | — | NT | NT |
| G | i | 429 | +++ | +++ | ++ | ++ | NT | NT | NT | NT |
| | ii | 444 | ++ | ++ | + | + | NT | NT | NT | NT |
| | iii | 413 | ++ | ++ | + | + | NT | NT | NT | NT |
| H | i | 383 | +++ | +++ | +++ | +++ | NT | NT | NT | NT |
| | ii | 393 | ++ | ++ | NT | NT | NT | NT | — | — |
| I | i | 407 | +++ | +++ | +++ | +++ | ++ | ++ | 144 hrs. + | 144 hrs. + |
| | ii | 419 | +++ | +++ | + | + | NT | NT | NT | NT |
| J | i | 394 | +++ | +++ | ++ | + | — | — | NT | NT |
| K | i | 450 | ++ | +++ | NT | NT | NT | NT | NT | NT |

NT = NOT TESTED
+++ = EXCELLENT
++ = GOOD
+ = FAIR
— = UNACCEPTABLE

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

What is claimed is:

1. A low fat topping which is free of non-fat milk solids comprising: on a weight basis about 3.0% to 7.0% fat, about 0.2 to 0.8% emulsifiers, about 1.0 to 1.75% stabilizers, about 30 to 55% water soluble carbohydrates, and about 35 to 65% water, wherein said low fat topping has a caloric density of from 1.5 to 2.5 calories per gram and when whipped has an overrun in excess of about 300%.

2. The topping of claim 1 comprising from about 0.50% to 1.75% water soluble proteins.

3. The topping of claim 2, wherein said water soluble proteins are selected from the group consisting of sodium caseinate and soy protein.

4. The topping of claim 1, wherein said fat is selected from the group consisting of palm kernel oil and a modified palm kernel oil, wherein said modified palm kernel oil is about 98% (w/w) palm kernel oil hydrogenated to an iodine value of about 1, and about 2% (w/w) of a fully hydrogenated form of a stearin fraction of palm oil.

5. The topping of claim 1, further comprising: about up to about 1.0% sodium caseinate.

6. The topping of claim 1, further comprising: salts, flavorings and colorants.

7. The topping of claim 6, wherein said salts are selected from the group consisting of sodium chloride, sodium citrate, disodium phosphate and sodium acid pyrophosphate.

8. The topping of claim 1, wherein the ratio of emulsifiers to fat is about 1:5 to 1:20.

9. The topping of claim 1, wherein the ratio of stabilizers to fat is about 1:3.64 to 1:2.63.

10. The topping of claim 1, wherein the emulsifiers are selected from the group consisting of lecithin, polysorbate 60, and hexaglyceryl disterate.

11. The topping of claim 1, wherein the stabilizers are selected from the group consisting of hydroxypropyl methyl cellulose, methyl cellulose, xanthan gum and propylene glycol alginate.

12. The topping of claim 11, wherein the propylene glycol alginate content is 0.75%.

13. The topping of claim 1, wherein said topping has a specific gravity of from 1.13 to 1.21.

14. The topping of claim 1, wherein said topping has a specific gravity of 1.20.

15. The topping of claim 1, wherein said topping is whipped in a conventional mixer to an aerated form having consistently high overruns, said aerated form of the topping having a specific gravity of 0.24 to 0.35.

16. The topping of claim 15, wherein said topping has an overrun between 340% and 450%.

17. The topping of claim 10, wherein the ratio of hexaglyceryl disterate to polysorbate 60 to lecithin is 1: 0.28–0.75: 0.21–0.88.

18. The topping of claim 17, wherein the ratio of hexaglyceryl disterate to polysorbate 60 to lecithin is 1: 0.56: 0.43.

19. The topping of claim 1, wherein the water soluble carbohydrates are selected from the group consisting of high fructose corn syrup, sucrose, dextrose and corn syrup.

20. The topping of claim 19, wherein the corn syrup has a dextrose equivalence from 15 to 65.

21. The topping of claim 20, wherein the corn syrup has a dextrose equivalence of 36.

22. The topping of claim 3, wherein said topping has 0.80% soy protein and 0.75% sodium caseinate.

23. A low fat topping comprising on a weight basis about 3-4% fat, about 0.25 to about 3.0% sodium caseinate, about 0.2 to 1.5% emulsifier, 30 to 55% water soluble carbohydrate selected from the group consisting of high fructose corn syrup, sugar, dextrose and combinations thereof, about 1.0 to about 1.75% stabilizers and about 35 to 65% water, wherein the topping has a caloric density of from 1.5 to 2.5 calories per gram and when whipped has an overrun in excess of about 300%.

24. The low fat topping of claim 23 wherein the water soluble carbohydrate comprises about 15 to about 30% high fructose corn syrup, about 7 to about 10% sugar, about 2 to about 3% dextrose or a combination thereof.

25. The low fat topping of claim 23 wherein total solids content of the topping is in the range of from about 40 to 50%.

* * * * *

UNITED STATES PATENT AND TRADEMARK OFFICE
CERTIFICATE OF CORRECTION

PATENT NO. : 5,759,609
DATED : Jun. 2, 1998
INVENTOR(S) : Robert J. Lynch

It is certified that error appears in the above-identified patent and that said Letters Patent is hereby corrected as shown below:

| Column | Line | |
|---|---|---|
| 3 | 24 | Change "stages,for" to --stages for--. |
| 4 | 8 | After "Iowa" insert --.--. |
| 6 | 55 | After "vitamins" change ";" to --,--. |
| 7-8 Table 1 | 27 | Change "0.00037" to --0.0003-- (11 occurrences). |
| 10 | 22 | Change "30°" to --130°--. |
| 15 | 33 | After "present" insert --.--. |
| 18 | 35 | After "sharp" insert --.--. |
| 22 Table 2 F.ii | | Change "027" to --0.27--. |
| 22 Table 3 D.ii, Col. "IN BOWL 72 HRS.": Change "+++" to --++--. | | |

Signed and Sealed this

First Day of December, 1998

Attest:

BRUCE LEHMAN

Attesting Officer

Commissioner of Patents and Trademarks